J. Monroe
Berth for Ships.
Nº 92,204.  Patented Jul. 6, 1869.
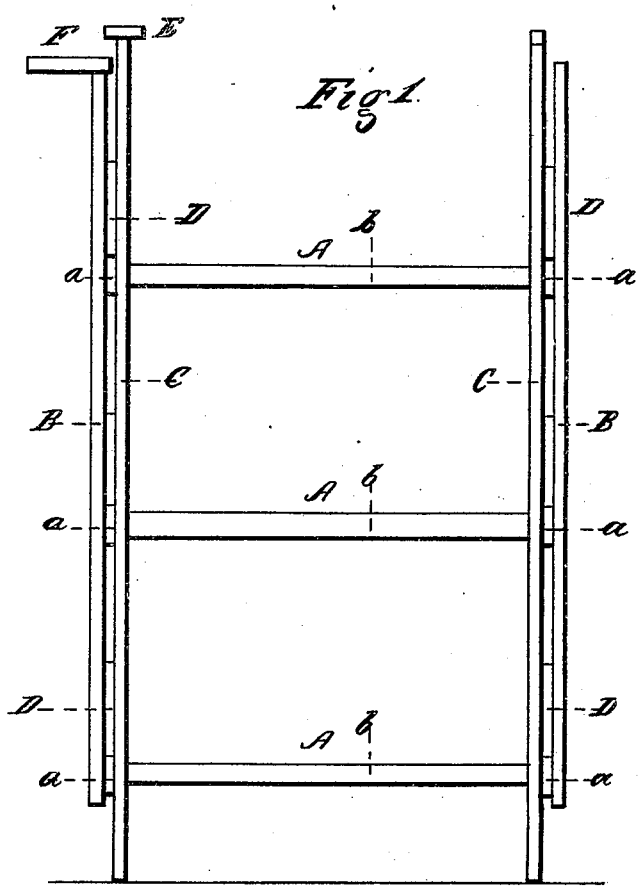
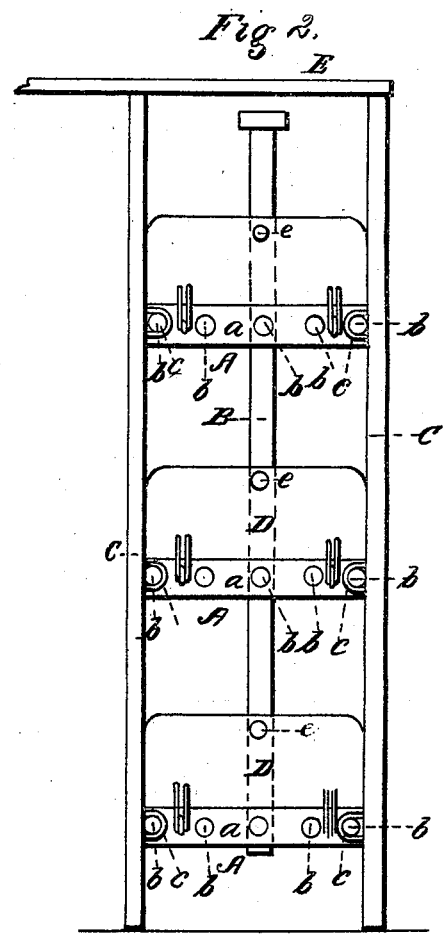
Witnesses:
Phil. F. Larner
Geo. B. Rothwell
Inventor:
Joshua Monroe Sheet 2, 2 Sheets
J. Monroe.
Berth for Ships.
N° 92,204. Patented Jul. 6, 1869.
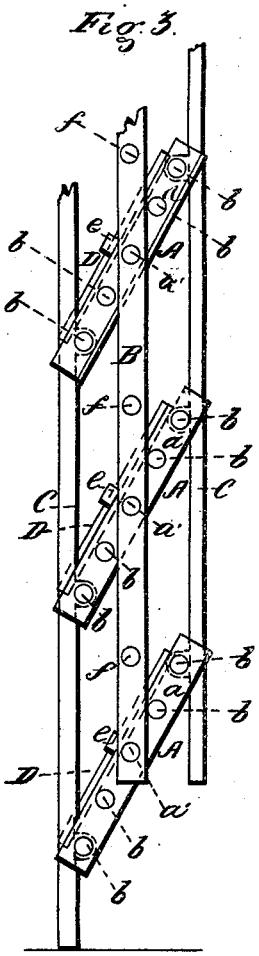
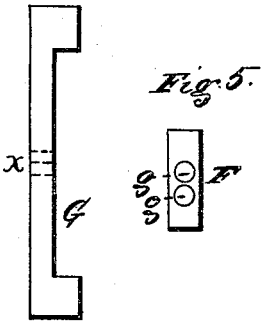
Witnesses:
Phil. F. Larner
Geo. Rothwell
Inventor:
Joshua Monroe.

United States Patent Office.

JOSHUA MONROE, OF NEW YORK, N. Y.

Letters Patent No. 92,204, dated July 6, 1869.

---

IMPROVEMENT IN SHIPS' BERTHS.

---

The Schedule referred to in these Letters Patent and making part of the same.

---

*To all whom it may concern:*

Be it known that I, JOSHUA MONROE, of the city, county, and State of New York, have invented certain new and useful Improvements in Beds, Berths, &c.; and I do hereby declare the following to be a full, clear, and exact description thereof, sufficient to enable those skilled in the art to which my invention appertains, to fully understand and use the same, reference being had to the accompanying drawings, forming part of this specification, and in which—

Figure 1 is a front elevation.

Figure 2, a transverse vertical section of fig. 1.

Figure 3, an end view, with the shelves inclined.

Figures 4 and 5, detached views to be hereinafter referred to.

My improvements are especially adapted to bunks and berths for use on shipboard and elsewhere; they may, however, be applied to other uses, as will be hereinafter set forth.

The object of my invention is to so construct bunks, berths, &c., as to render them applicable to other uses, and to economize space in their storage.

My invention consists in constructing the bottom of each berth separate, and pivoting these to common vertical end-pieces. These bottoms are connected together by other vertical pieces, which form supports for the berths. Head and foot-boards are so hung to the bottoms as to serve, when turned up, to keep the series of berths rigid.

My invention will be fully understood from the following detail description, and by reference to the drawings, wherein similar letters of reference indicate corresponding parts in the several figures.

In the drawings—

A A A represent the bottoms of the berths. These are constructed each of end-pieces *a*, connected together by slats *b*. These slats may be round or square, as desired, and should be made of flexible wood, so as to form an easy bed-bottom.

I prefer to have the central slat made longer than the rest, so as to project at each end to form pivots *a'*. These pivots may, however, be made of separate pins fixed in the end-pieces *a*.

B represents a flat strip connecting the berth-bottoms together, being provided with holes to receive the pivots *a'*.

C C represent upright pieces, placed one at each corner of the berth-bottoms, and extending both above and below the same, to form supports. These pieces are connected with each berth-bottom A, by means of staples *c*, fixed in the pieces C, over the outer slats *b*.

D D represent the head and foot-boards, hinged in any suitable manner to the inside of each end-piece *a*, so as to fold down on the slats *b*. In the outer side of each head and foot-piece, I fix a projecting-pin, *e*, which, when the parts D D are turned up, enter holes *f*, made in the vertical pieces B.

Fig. 1 shows the berths as in position for use. On account of the peculiar construction of the berths, and the mode of connecting them together, they may be folded up closely, so as to be almost entirely out of the way.

Fig. 3 shows the berths only partially folded.

This feature, economy of space, is an advantage which can hardly be overrated. It will be especially appreciated on shipboard, where every foot of space is valuable.

Each series or frame of berth is made separate, as shown in fig. 1, and two or more series may be connected together by means of coupling-blocks F, shown in fig. 5. These blocks are provided with two holes *g g*, which are fitted on to the upper ends of the pieces B of two contiguous series. In order to connect together series of bunks situated on opposite sides of a room or cabin, I make use of long strips E, provided near each end with two holes, for the reception of the upper extremities of the corner-pieces C C. This latter connection especially renders the frames or series of berths more stable. Curtains may be hung from the connections E, to form a private apartment.

My invention is useful, not only on ships and steamboats, but also in hotels and private residences, where, on account of contracted apartments, ordinary bedsteads could not be used to advantage, as will be obvious.

And further, when not needed for sleeping-purposes, the series of berths may be used to great advantage as shelves, on which clothing, bedding, and other goods may be packed; or, as a book-case, in which instance the frame is so adjusted that the shelves occupy an inclined position—not to such a degree, however, as is represented in fig. 3—and the frame then rested against a wall. By fixing a block, G, shown in fig. 4, transverse to each of the rounded ends of the strips B, said blocks being for this purpose formed with a central mortise, *x*, and the frame, shown in fig. 1, inverted, a very convenient drying-frame is produced, the fabrics being suspended from the slats *b*, which furnish a large amount of surface. In printing offices also, and paper-warehouses and manufactories, these frames may be advantageously employed as racks whereon to deposit the sheets.

When folded closely together, these frames serve as screens, and can also be used, in cases of emergency, as ladders.

Besides the uses mentioned to which these frames are applicable, there are doubtless many others which combine to render the invention valuable to numerous classes of people, and under different circumstances of necessity.

It will, of course, be understood that the use of the frames as clothes-driers, book-shelves, &c., will not impair their use as bedsteads and berths, to which latter they can be readily converted from either of those before mentioned and others. For this reason, my improvement will be especially useful in hotels, where, in consequence of great events and public excitement, long seasons of quiet are often followed without intervening time for preparation by a sudden and unexpected ingress of guests.

As the frames when packed occupy but little space, they may be readily transported by an army on the march for use in hospitals, and even as tent-frames, the series of berths being placed upright in the centre and covered by the canvas, thus affording dry and elevated bunks, whereby much of the disease now contracted by the men sleeping on the ground will be avoided.

The frames may, when desired, be so constructed as to be highly ornamental to any apartment, as will be understood by manufacturers of household-furniture.

I do not propose to limit myself to the berth-bottom, constructed as described, for this may be variously changed, doubtless in many cases with good results. For instance, sacking may be substituted for the inner slats.

Having thus described my invention,

What I claim as new, and desire to secure by Letters Patent, is—

1. A folding-frame, composed of a series of shelves arranged one above another, and connected together by means of common supports, substantially as herein described.

2. The combination of the bottoms A, vertical strips B, and corner-supports C, all arranged substantially as described, and forming a folding frame.

3. In combination with the bottoms A, strips B, and corner-supports C, the hinged boards D, which serve to give rigidity to the frame, substantially as herein set forth.

4. In combination with the folding frames or series of berths, constructed and arranged substantially as described, the coupling-pieces E F, and detachable feet G, substantially as described.

To the above I have signed my name, this 26th day of January, 1869.

JOSHUA MONROE.

Witnesses:
PHIL. F. LARNER,
GEO. W. ROTHWELL.